US012680603B2

(12) United States Patent
Hombauer et al.

(10) Patent No.: US 12,680,603 B2
(45) Date of Patent: Jul. 14, 2026

(54) LAYOUT FOR ELECTRICAL DRIVE UNIT

(71) Applicant: Bayerische Motoren Werke Aktiengesellschaft, Munich (DE)

(72) Inventors: Michael Hombauer, Harthausen (DE); Michael Mainusch, Munich (DE); Georg Johann Meingassner, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/645,817

(22) Filed: Dec. 23, 2021

(65) Prior Publication Data

US 2023/0204095 A1     Jun. 29, 2023

(51) Int. Cl.
| | |
|---|---|
| *F16H 57/037* | (2012.01) |
| *B60K 17/12* | (2006.01) |
| *B60K 17/16* | (2006.01) |
| *F16H 57/031* | (2012.01) |
| *H02K 7/00* | (2006.01) |
| *H02K 7/116* | (2006.01) |
| *F16H 57/02* | (2012.01) |

(52) U.S. Cl.
CPC ........... *F16H 57/037* (2013.01); *B60K 17/12* (2013.01); *B60K 17/16* (2013.01); *F16H 57/031* (2013.01); *H02K 7/006* (2013.01); *H02K 7/116* (2013.01); *F16H 2057/02034* (2013.01)

(58) Field of Classification Search
CPC ....... B60K 17/12; B60K 17/16; F16H 57/031; F16H 57/037; F16H 2057/02034; H02K 7/006; H02K 7/116; H02K 11/33
See application file for complete search history.

(56) References Cited

U.S. PATENT DOCUMENTS

| | | | | |
|---|---|---|---|---|
| 6,059,684 | A * | 5/2000 | Sasaki ...................... | B60K 1/00 |
| | | | | 180/65.6 |
| 9,358,870 | B2 * | 6/2016 | Hotta ..................... | B60K 6/405 |
| 9,692,277 | B2 | 6/2017 | Pearce, Jr. et al. | |
| 11,353,103 | B2 * | 6/2022 | Kawanishi ............. | H02K 7/116 |
| 2005/0006967 | A1 * | 1/2005 | Bologna ................ | H02K 7/116 |
| | | | | 310/83 |
| 2016/0138659 | A1 * | 5/2016 | Strandberg .............. | F16D 3/227 |
| | | | | 475/150 |

(Continued)

FOREIGN PATENT DOCUMENTS

| | | | | |
|---|---|---|---|---|
| DE | 102016217920 | A1 * | 3/2018 | |
| FR | 3090548 | A1 * | 6/2020 | ............... B60K 1/00 |

(Continued)

*Primary Examiner* — Joseph Brown
(74) *Attorney, Agent, or Firm* — Crowell & Moring LLP

(57)     ABSTRACT

An electrical drive unit includes an electric motor having a first transverse end and an opposite second transverse end, and a gearbox including a main gearbox portion and a transverse projection portion. The motor is attached to the gearbox at the second transverse end of the motor and is located on a first transverse side of the main gearbox portion in a first transverse direction. The transverse projection portion of the gearbox includes at least one gear of the gearbox and extends from the first transverse side of the main gearbox portion such that the transverse projection portion and at least a portion of the at least one gear extends in the first transverse direction beyond the second transverse end of the motor.

20 Claims, 7 Drawing Sheets

(56)           References Cited

U.S. PATENT DOCUMENTS

| | | | |
|---|---|---|---|
| 2018/0287467 A1* | 10/2018 | Ogino | B60L 3/0061 |
| 2019/0249765 A1* | 8/2019 | Ito | B60K 1/00 |
| 2020/0240512 A1* | 7/2020 | Yashiro | F01M 5/00 |
| 2021/0039487 A1* | 2/2021 | Engerman | B60K 1/00 |
| 2022/0316582 A1* | 10/2022 | Inoue | F16H 57/0483 |

FOREIGN PATENT DOCUMENTS

| | | | | |
|---|---|---|---|---|
| WO | WO-2019118866 A1 * | 6/2019 | | B60K 1/00 |
| WO | WO-2021095380 A1 * | 5/2021 | | B60K 1/00 |

* cited by examiner

LAYOUT FOR ELECTRICAL DRIVE UNIT

BACKGROUND

Electric vehicles (EVs) are increasingly commonplace. A primary component of an EV is an electrical drive unit, which is the primary means of propulsion of the EV. The electrical drive unit often includes an electric motor (also called an "e-machine") and a gearbox including one or more gears. In some approaches, a power inverter is also included as a part of the electrical drive unit. These three items (motor, gearbox, and power inverter) may by directly connected or integrated together to form a modular electrical drive unit assembly, which may then be installed into the EV.

The design and layout of the electrical drive unit within the EV presents many complex issues. These issues include considerations of weight within the vehicle, weight balance within the vehicle, and installation space within the vehicle. Further, certain layout choices can limit one or more factors for the electrical drive unit, including, for example a maximum size of a motor and/or a type of motor that can be utilized. Additionally, other layout and construction design choices can impact long-term or short-term quality of the electrical drive unit and its implementation within the EV.

Highly-integrated electrical drive units are known in the prior art, and typically include a motor, a gearbox (e.g., with a differential), and a power inverter. One known layout and arrangement for an electrical drive unit utilized by Bayerische Motoren Werke AG (BMW) in Munich, Germany, includes the gearbox located transversely on one side of the centerline of vehicle and/or the electrical drive unit, with the motor fully or partly arranged on the other side of the centerline of vehicle and/or electrical drive unit, and with the power inverter on the top of the electrical drive unit assembly (e.g., in a "toploader" assembly).

Another known layout and arrangement is disclosed in U.S. Pat. No. 9,692,277, titled "Integrated Electric Motor Assembly," assigned to Tesla Motors, Inc., in Palo Alto, California (and as is similarly disclosed in its related applications and patents). The patent discloses a motor assembly, including a motor, gearbox, and power inverter, arranged in a "T-shaped" architecture, with the gearbox positioned on and extending along a centerline of the EV or a centerline of the assembly (in a "longitudinal" or "x-axis" direction of the EV), and with the motor and the power inverter extending in opposite directions along the cross axis of the "T-shaped" architecture (in a "transverse" or "y-axis" direction of the EV). The patent similarly discloses that the entire motor is located on one side of the centerline, while the entire power inverter is located on the other side of the centerline.

This "T-shaped" layout with the gearbox extending along the centerline of the EV and the motor and inverter on opposite sides of the centerline presents multiple disadvantages. First, because the gearbox is in the center of the vehicle, the transverse space for a motor (i.e., between the gearbox and a transverse side of the vehicle) is limited. As such, the maximum size (i.e., length) of motor is limited. Similarly, the type of motor is limited to motor types that are shorter in length, for example, possibly excluding high power separately excited synchronous motors (SSM). This reduces the possible maximum power output of the motor, and of the assembly as a whole. Additionally, because the motor is the heaviest item in the assembly, the overall weight balance of the assembly is offset to the side of the motor. This can then offset the center of gravity of the vehicle, which can negatively impact handling, and can also result in uneven wear or present differing design constraints for various mounting components for the assembly. Further still, because the motor is typically larger than the power inverter, the assembly may require more space than is required for the power inverter, which results in wasted space in the assembly and in the installation in the EV, and a larger over all assembly than is necessary.

U.S. Pat. No. 9,692,277 also discloses the use of a multi-piece housing with multiple separate housing pieces that are connected together. However, this modular housing construction relies on multiple bolts or other connection means at the interface between the motor housing and the gearbox housing, which interface is subject to high amounts of torque and stress between the motor and the gearbox. Because these multiple bolts at this interface are subject to such high stresses and vibrations, there is a higher likelihood for failure at one or more of these bolt locations and housing interfaces. This can lead to quality issues, such as the generation of vibrations, noise, and fluid and/or coolant leaks, to major issues such as housing separation or complete assembly failure. Further, such a modular housing design requires additional steps, effort, and cost for assembly to ensure all bolts and connections between the motor housing and the gearbox housing are mounted correctly, and can require additional gasketing or other design aspects to implement the interface between these two housings.

SUMMARY

To address these and other concerns, an improved electrical drive unit, including an improved layout, as well as an EV including the improved electrical drive unit, is disclosed. In accordance with various embodiments, the electrical drive unit includes an electric motor and a gearbox, and in some embodiments, a power inverter. Generally, the motor is transversely arranged, wherein reference throughout this disclosure to a first or second transverse direction refers to the transverse directions (e.g., left and right, side-to-side, or the "y-direction" as is traditionally understood in the art) of both the electrical drive unit and of an electric vehicle (EV) in which the electrical drive unit may be installed (see, e.g., FIG. 6). The gearbox includes a main gearbox portion and a transverse projection portion. The motor is attached to the gearbox at a transverse end of the motor from which a motor output shaft extends. The motor is located on a first transverse side of the main gearbox portion. The transverse projection portion of the gearbox may include at least one gear of the gearbox and extends from the first transverse side of the main gearbox portion in the first transverse direction (being the same transverse side of the gearbox as the motor). The transverse projection portion and at least a portion of the at least one gear extends in the first transverse direction beyond the transverse end of the motor (i.e., the transverse end from which the motor output shaft extends) that is attached to the gearbox. In certain approaches, this forms an "L-shaped" gearbox with the main gearbox portion and the transverse projection portion of the gearbox. In some approaches, the power inverter may be located on a second transverse side of the main gearbox portion, opposite from the motor. In certain embodiments, the centerline of the gearbox and/or the centerline of the main gearbox portion are offset from a centerline of the electrical drive unit and/or of the EV.

By moving the gearbox away from the centerline of the electrical drive unit and the centerline of the EV, the motor is allowed to cross the centerline, thereby maximizing the amount of space that can be utilized for the motor, and allowing for longer, more powerful motors to be utilized, as well as other types of longer motors to be utilized, such as SSM motors. While the gearbox is moved away from the centerline, the transverse projection portion, which may include the differential, can project back toward the center of the vehicle from the main gearbox portion, e.g., next to the motor housing. This allows for equal or similar length drive shafts to still be utilized, despite the gearbox being off of the centerline of the EV. Further still, the overall space required by the electrical drive unit (e.g., transversely side-to-side in the y-axis direction) can be reduced as less space (e.g., in the y-axis direction) is provided for the comparatively smaller power inverter, for example, because the power inverter is attached to the transverse side surface area of the gearbox. This can thereby reduce overall weight of the electrical drive unit by reducing the size of the portion of the housing that encloses the power inverter. Further still, because the motor can cross the centerline of the EV and/or the overall electrical drive unit, the electrical drive unit may have a center of gravity much closer to the centerline of the electrical drive unit and the centerline of the EV. This will greatly improve the overall weight balance of the vehicle, thereby improving handling. Further still, this more centralized center of gravity in the electrical drive unit can help evenly distribute and balance the weight and forces at the multiple connection points between the electrical drive unit and the EV. This helps improve long-term wear on those components, as well as helps reduce vibration and noise generation within the EV by the electrical drive unit.

Further, in some embodiments, the electrical drive unit includes a central housing formed of a single integrated housing that includes at least a portion of a housing of the gearbox and at least portion of a housing of the motor. By using the single integrated housing, the electrical drive unit is stronger and stiffer than when utilizing separate, modular housing components, particularly at the junction between the motor and the gearbox where torque forces between the motor and gearbox are high. Further, the single integrated housing reduces the number of individual parts in the electrical drive unit, and specifically reduces the number of bolts and connections between the motor and gearbox housings, which can greatly reduce the number of failure points at this high-stress interface. Additionally, installation effort can be reduced (e.g., as less bolts are required to be screwed in). Further, due to the improved stiffness of the single integrated housing, the electrical drive unit is quieter, produces less vibration, and is more responsive.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
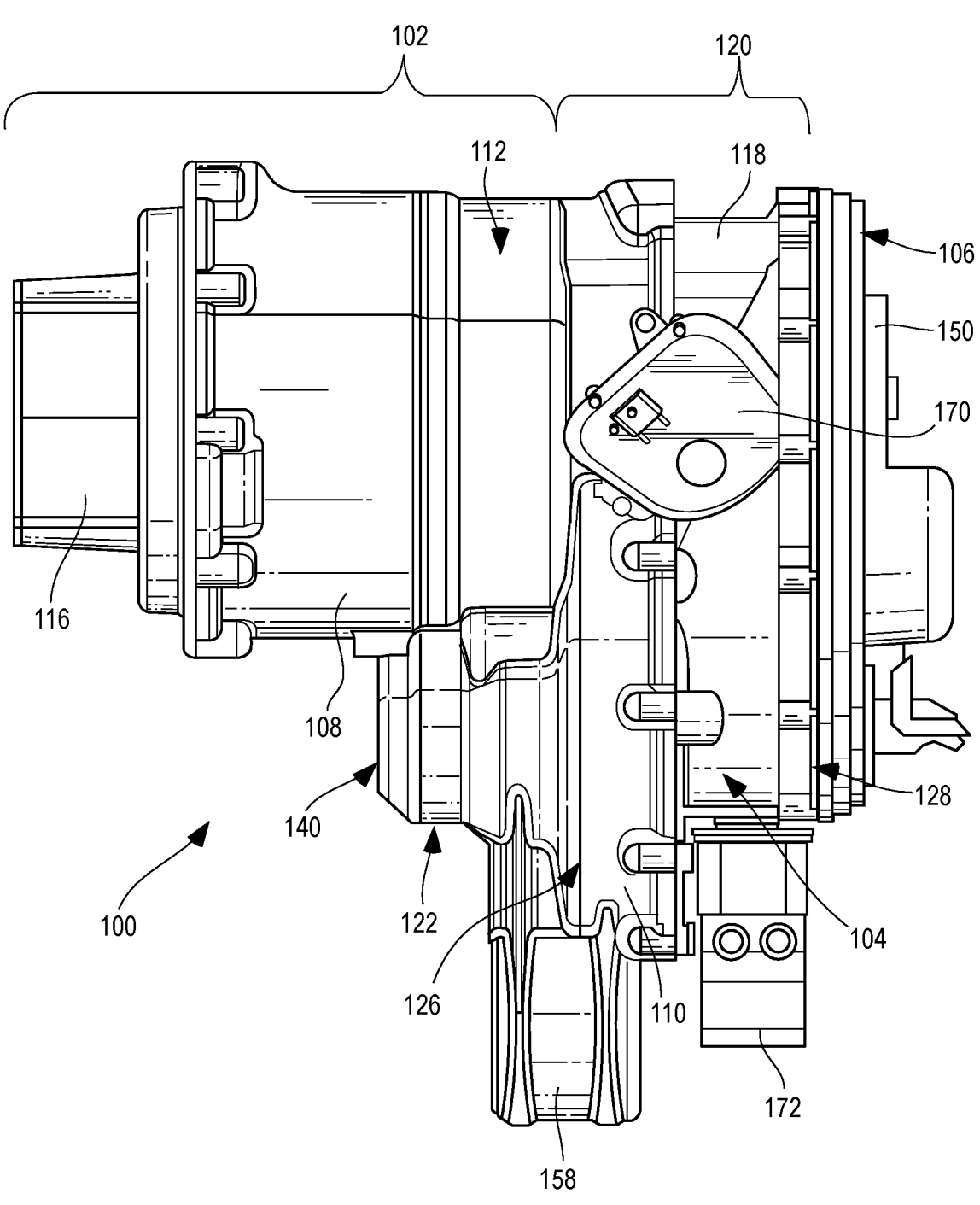
FIG. 1 illustrates a top-down view of the electrical drive unit in accordance with various embodiments.
Figure 2:
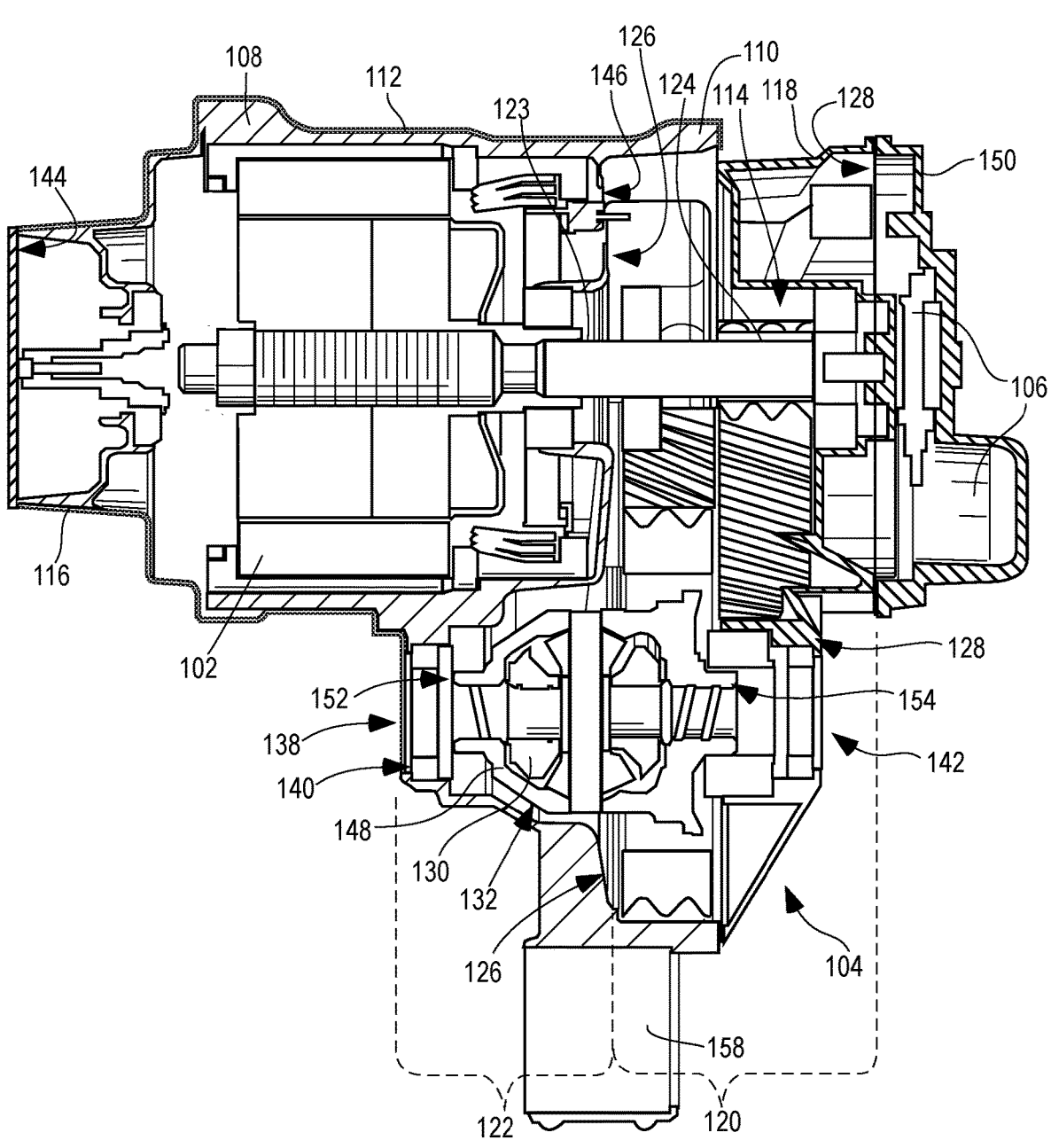
FIG. 2 illustrates a sectional view of the electrical drive unit in accordance with various embodiments.
Figure 3:
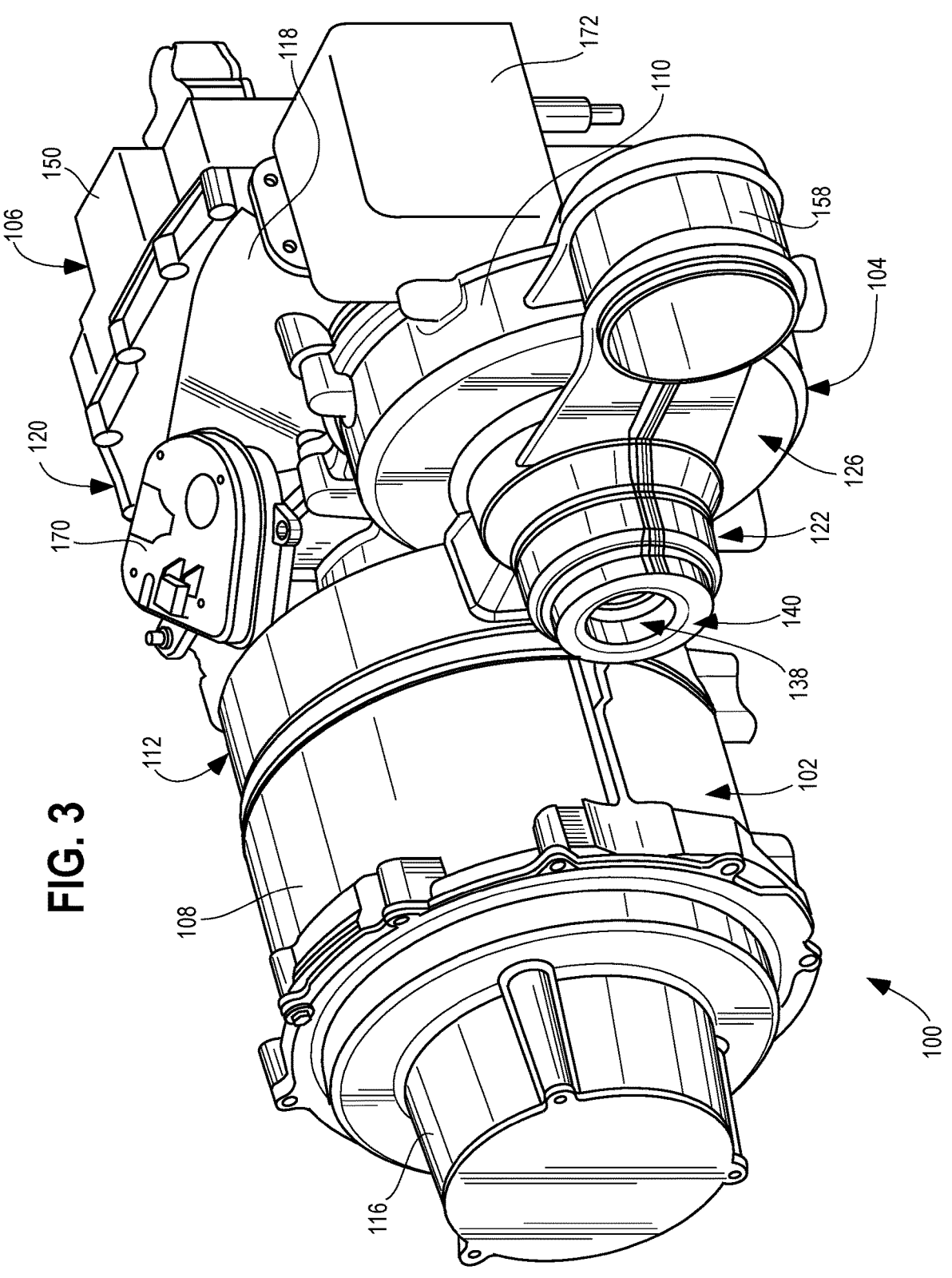
FIG. 3 illustrates a perspective view of the electrical drive unit in accordance with various embodiments.
Figure 4:
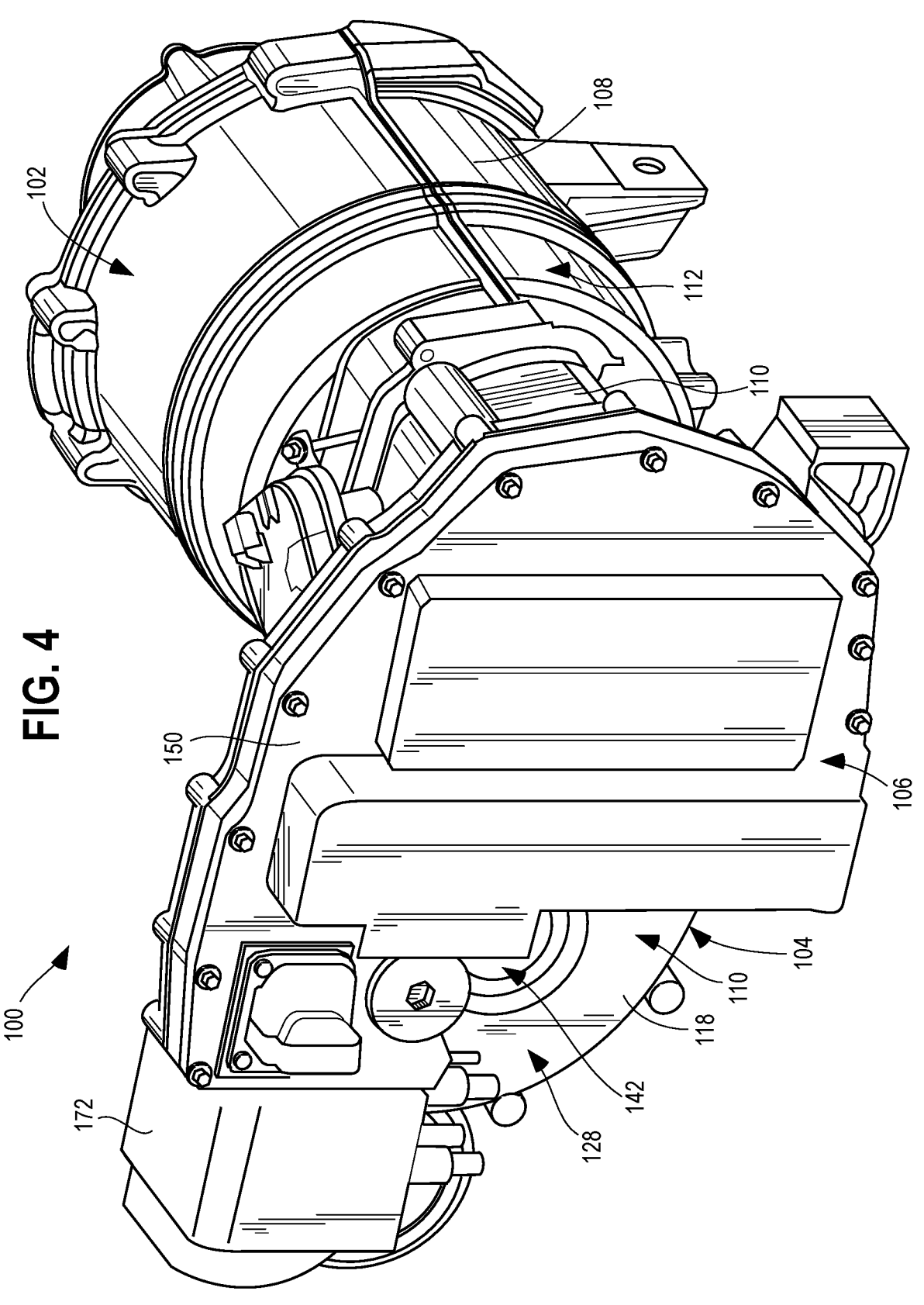
FIG. 4 illustrates another perspective view of the electrical drive unit in accordance with various embodiments.

FIG. 1 illustrates a top-down view of the electrical drive unit 100 in accordance with various embodiments, while FIG. 2 illustrates a sectional view of the electrical drive unit 100 in accordance with various embodiments. FIGS. 3 and 4 provide perspective views of the electrical drive unit 100 in accordance with various embodiments. The following description is provided with reference to these figures. In FIGS. 1 and 2, the electrical drive unit 100 is shown such that the left and right directions are the transverse directions (e.g., side-to-side, or the "y-direction") of both the electrical drive unit 100 and of an electric vehicle (EV) 200 in which the unit 100 may be installed (see FIG. 6). Throughout this disclosure, with reference to FIGS. 1 and 2, the left direction is generally referred to as the "first transverse direction," while the right direction is generally referred to as the "second transverse direction." However, these directions are not so limited and can be switched, for example, if the layout of the unit 100 were mirrored left-to-right, or rotated 180 degrees.

The electrical drive unit 100 includes a motor 102, a gearbox 104, and, in some embodiments, a power inverter 106. The motor 102 is housed within a motor housing 108, while the gearbox 104 is housed within a gearbox housing 110. In various embodiments, the electrical drive unit 100 may include a central housing 112 that is formed of a single integrated housing. For example, the central housing 112 may be from a single cast and/or machined assembly that includes space to house at least a majority of the motor 102 and at least a portion of the plurality of gears 114 of the gearbox 104. The motor 102 and a plurality of gears 114 of the gearbox 104 (including, for example, the at least one gear 130, a portion of all of the gears (e.g., the helical gears) of the differential section 132, a portion or all of the motor output shaft 123, and a portion or all of the input gear 124, discussed below) are mounted within the central housing 112. As such, in one approach, the motor 102 is attached to the gearbox 104 at least by virtue of the motor 102 and the plurality of gears 114 of the gearbox 104 both being mounted within the central housing 112, as well as due to the attachment of the motor output shaft 123 to the input gear 124 and the other gears of the plurality of gears 114. The central housing 112 forms and includes at least a portion of the gearbox housing 110 and at least portion of motor housing 108. Other items may also be mounted and housed within the central housing 112, including an oil pump, an oil filter, electrical harnesses, cooling parts, and cooling liquid channels.

A motor end cover 116 may be attached to the central housing 112 in the first transverse direction and, together with the central housing 112, enclose and house the motor 102 within the motor housing 108. Similarly, a gearbox cover 118 may attach to a side of the central housing 112 in the second transverse direction (e.g., to the right in the figures) and enclose the plurality of gears 114 of the gearbox 104 within the gearbox housing 110. By this arrangement, the gearbox housing 110 that encloses the plurality of gears 114 is formed by the central housing 112 and is enclosed by the gearbox cover 118.

In various embodiments, the gearbox 104 can be separated into two parts: a main gearbox portion 120 and a transverse projection portion 122. The main gearbox portion 120 may be formed by the central housing 112 and the gearbox cover 118. Generally, the main gearbox portion 120 extends in the longitudinal direction of the EV 200 (e.g., from front to back) and includes many of the plurality of gears 114 of the gearbox 104. As shown in FIG. 2, the main gearbox portion 120 includes at least part of an output shaft 123 that extends from the motor 102 in the second transverse direction and which is connected to the input gear 124, which are then coupled to various other intermediary gears that operatively connect to the input gear 124 and receive torque therefrom. The main gearbox portion 120 may also house a portion of a parking brake or parking lock 170, which can interface with the output shaft 123 from the motor 102 and/or the intermediate shaft of the gearbox in order implement a parking brake function. The main gearbox portion 120 has a first transverse side 126 in the first transverse direction (e.g., left in the figures), and a second transverse side 128 in the second transverse direction (e.g., right in the figures).

In various embodiments, the transverse projection portion 122 projects out of and extends from the first transverse side 126 of the main gearbox portion 120 in the first transverse direction. The transverse projection portion 122 may be formed in the central housing 112 such that the central housing 112 includes a portion of the gearbox housing 110 that forms the transverse projection portion 122. The transverse projection portion 122 includes therein at least one gear 130 of the plurality of gears 114 of the gearbox 104. In various approaches, the gearbox 104 includes a differential section 132, and the at least one gear 130 located in the transverse projection portion 122 forms at least a part of the differential section 132. The differential section 132 may also include one or more rotating housings 148 located entirely or at least partially within the transverse projection portion 122. The differential section 132 includes a first transverse end 152 in the first transverse direction (e.g., to the left in the figures) and a second transverse end 154 in the second transverse direction. The differential section 132 couples to a pair of drive shaft assemblies, including a first drive shaft assembly 134 extending in the first transverse direction, and a second drive shaft assembly 136 extending in the second transverse direction. The transverse projection portion 122 includes a first opening 138 on a first transverse side 140 of the transverse projection portion 122 in the first transverse direction, where the first opening 138 is configured to receive the first drive shaft assembly 134 so that it may couple to the differential section 132. The second transverse side 128 of the main gearbox portion 120 in the second transverse direction includes a second opening 142 configured to receive the second drive shaft assembly 136 so that it may couple to the differential section 132. The first drive shaft assembly 134 and the second drive shaft assembly 136 may couple to the rear or front wheels to provide torque to the wheels in order to move the EV 200.

In various embodiments, the main gearbox portion 120 and the transverse projection portion 122 together form an "L-shape." For example, the main gearbox portion 120, extending in the forward and rearward direction, may form the main upright portion of the letter "L," and the transverse projection portion 122 may form the sideways extending portion of the letter "L." Although the figures show this configuration in a reverse "L-shape" (with the transverse projection portion 122 extending to the left), if the unit 100 were mirrored, a non-reversed "L-shape" is possible (with the transverse projection portion 122 extending to the right). Similarly, in various views, the main gearbox portion 120, the transverse projection portion 122, and the motor 102 may form a "C-shape" (reversed), where the transverse projection portion 122 forms the bottom of the "C-shape," the motor 102 forms the top of the "C-shape," and where the main gearbox portion 120 (and power inverter 106) form the upright portion of the "C-shape." In this configuration, as is shown in the figures, the differential section 132 within the transverse projection portion 122 is located on the same transverse side of the gearbox 104 as the motor 102, while the power inverter 106 is located on the other transverse side of the gearbox 104 as the motor 102.

The power inverter 106 may include one or more circuit assemblies including a plurality of electrical components. The power inverter 106 receives direct current (DC) power from a battery or other electrical storage device (not shown) via a battery voltage connector 172 and converts that energy into alternating current (AC) power, which is then provided to the motor 102 to cause the motor 102 to rotate. The power inverter 106 may be located on the second transverse side 128 of the main gearbox portion 120 in the second transverse direction (e.g., to the right in the figures). This second transverse side 128 is opposite from the first transverse side 126 of the main gearbox portion 120 on which the motor 102 and the transverse projection portion 122 are located. In certain embodiments, the second transverse side 128 of the main gearbox portion 120 is formed at least in part by the gearbox cover 118. The power inverter 106 may be attached to the second transverse side 128 of the gearbox cover 118 in the second transverse direction. A power inverter cover 150 may be attached to the second transverse side 128 of the gearbox cover 118 in the second transverse direction to enclose the power inverter 106.

With reference to FIG. 2, the motor 102 is shown within the motor housing 108. The motor 108 may extend in the transverse direction (e.g., from left to right), with a first transverse end 144 extending in first transverse direction (e.g., to the left) and an opposite second transverse end 146 extending in a second transverse direction (e.g., to the right). The first transverse direction is opposite to the second transverse direction. The motor output shaft 123 extends from the second transverse end 146 of the motor 102 in the second transverse direction into the gearbox 104. The motor 102 is attached to the gearbox 104 at the second transverse end 146 of the motor 102. For example, the motor output shaft 123 of the motor 102 attaches to the input gear 124 of the gearbox 104 and couples to the other gears of the plurality of gears 114 of the gearbox 104. The motor 102 rotates the motor output shaft 123, which in turn imparts a torque force on the input gear 124, which is then transmitted to the other gears of the plurality of gears 114 of the gearbox 104. Additionally, as mentioned above, the motor 102 is also attached to the gearbox 104 due to the motor 102 and the plurality of gears 114 of the gearbox 104 both being mounted within the central housing 112. The motor 102 is located on the first transverse side 126 of the main gearbox portion 120 of the gearbox 104 in the first transverse direction (e.g., on the left side of the main gearbox portion 120), which is the same transverse side of the main gearbox portion 120 of the gearbox 104 as the transverse projection portion 122. In various embodiments, an input shaft and input gear 124 are directly coupled to the motor 102 and interface with the plurality of gears 114 of the gearbox 104 to transfer rotational torque from the motor 102 to the plurality of gears 114.

In various embodiments, the transverse projection portion 122 extends in the first transverse direction (e.g., to the left) beyond the second transverse end 146 of the motor 104. This is shown in FIG. 2, where the transverse projection portion 122 (e.g., the first transverse side 140, e.g., left side, of the transverse projection portion 122) extends transversely to the left beyond the second transverse end 146 (e.g., the right end) of the motor 104. Put another way, the second transverse end 146 of the motor 104 extends in the second transverse direction (e.g., to the right) beyond at least the first transverse side 140, e.g., left side, of the transverse projection portion 122.

As mentioned above, the transverse projection portion 122 may include therein at least one gear 130 of plurality of gears 114 of the gearbox 104, which may be a part of the differential section 132. In various embodiments, at least a portion of the at least one gear 130 may also extend in the first transverse direction (e.g., to the left) beyond the second transverse end 146 of the motor 104. This is again shown in FIG. 2, where the at least one gear 130 (e.g., an internal gear of the differential section 132) extends transversely to the left beyond the second transverse end 146 (e.g., the right end) of the motor 104. Similarly, the transverse projection portion 122 may include at least a portion of the differential section 132, and the differential section 132 may further include at least one rotating housing 148. In various embodiments, at least a portion of the at least one rotating housing 148 may also extend in the first transverse direction (e.g., to the left) beyond the second transverse end 146 of the motor 104. This is again shown in FIG. 2, where the at least one rotating housing 148 of the differential section 132 extends transversely to the left beyond the second transverse end 146 (e.g., the right end) of the motor 104.

By configuring the gearbox 104 in this manner (e.g., such that the main gearbox portion 120 and the transverse projection portion 122 form an "L-shape" gearbox 104), the transverse projection portion 122 can be positioned offset in the longitudinal direction of the EV relative to the motor 102 (e.g., behind or in front of the motor 102). Described another way, the gearbox 104 wraps around the second transverse end 146 (e.g., the right end) of the motor 102, thereby allowing the second transverse end 146 of the motor 102 to extend over the centerline 162 of the EV 200 and the centerline 164 of the electrical drive unit 100 (see FIG. 7). This configuration allows space for a longer and/or more powerful motor 102 to be utilized, while still allowing the differential section 132 to be centered at or near the centerline 162 of the EV 200. Additionally, this configuration can reduce overall width in the transverse direction of the electrical drive unit 100 as less space is provided for the comparatively smaller power inverter 106 while a larger amount of space is provided for the larger motor 102. Further, this configuration can also reduce overall weight of the electrical drive unit 100 by reducing the size of the portion of the housing that encloses the power inverter 106.

Figure 5:
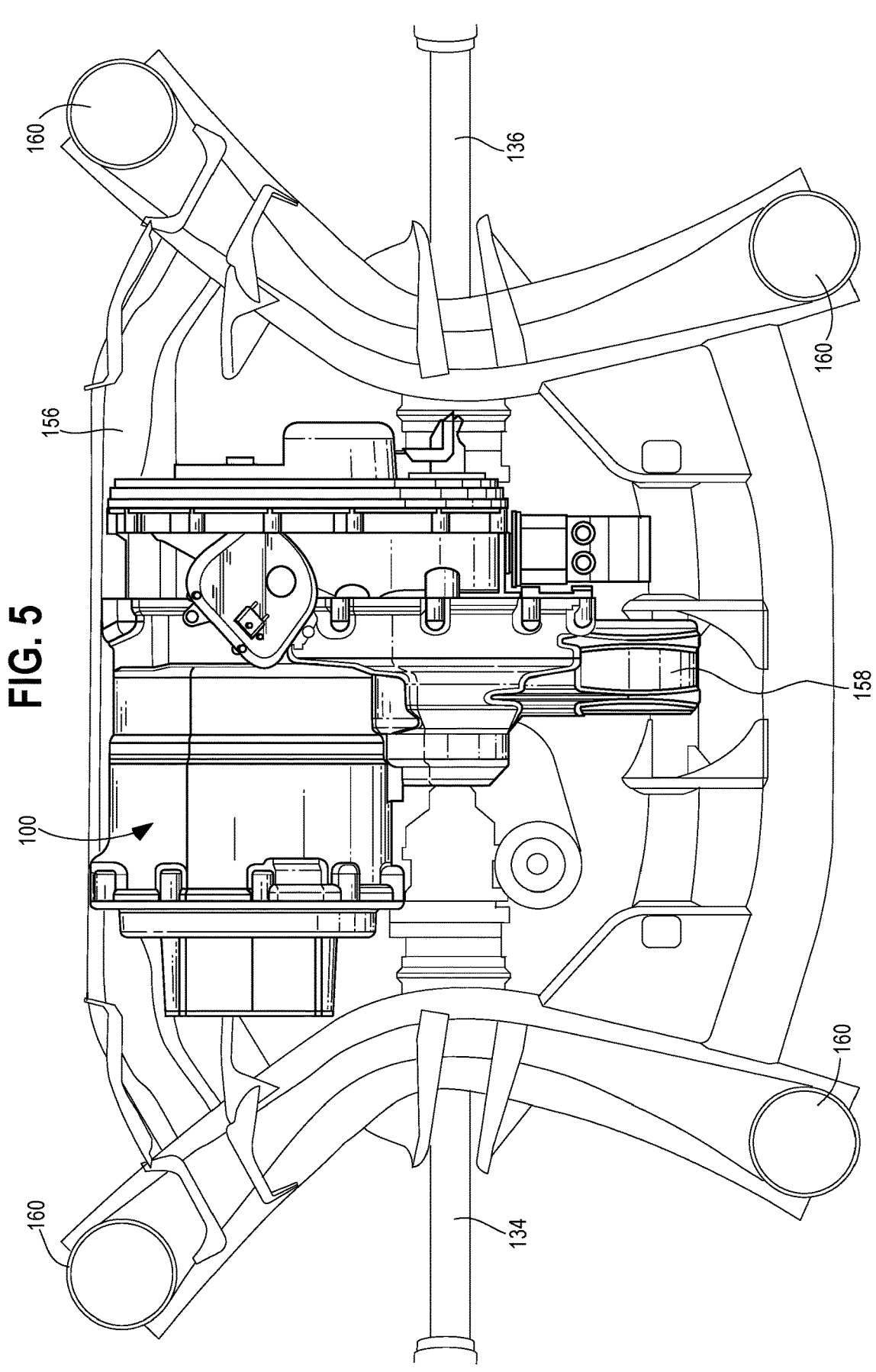
FIG. 5 illustrates the top-down view of the electrical drive unit of FIG. 1 mounted in a frame sub-assembly in accordance with various embodiments.

FIG. 5 shows a top-down view of the electrical drive unit 100 mounted in a frame sub-assembly 156 in accordance with various embodiments. Various mounts of the electrical drive unit 100, such as mount 158, attach to the frame sub-assembly 156. The frame sub-assembly 156 includes vehicle mounts 160 that mount to corresponding locations within the EV 200 to attach the frame sub-assembly 156, including the electrical drive unit 100 mounted thereon, to the EV 200. The first drive shaft assembly 134 is shown attached to the electrical drive unit 100 and extending in the first transverse direction (e.g., to the left in FIG. 5) toward a first wheel (not shown). The second drive shaft assembly 136 is shown attached to the electrical drive unit 100 and extending in the second transverse direction (e.g., to the right in FIG. 5) toward a second wheel (not shown).

Figure 6:
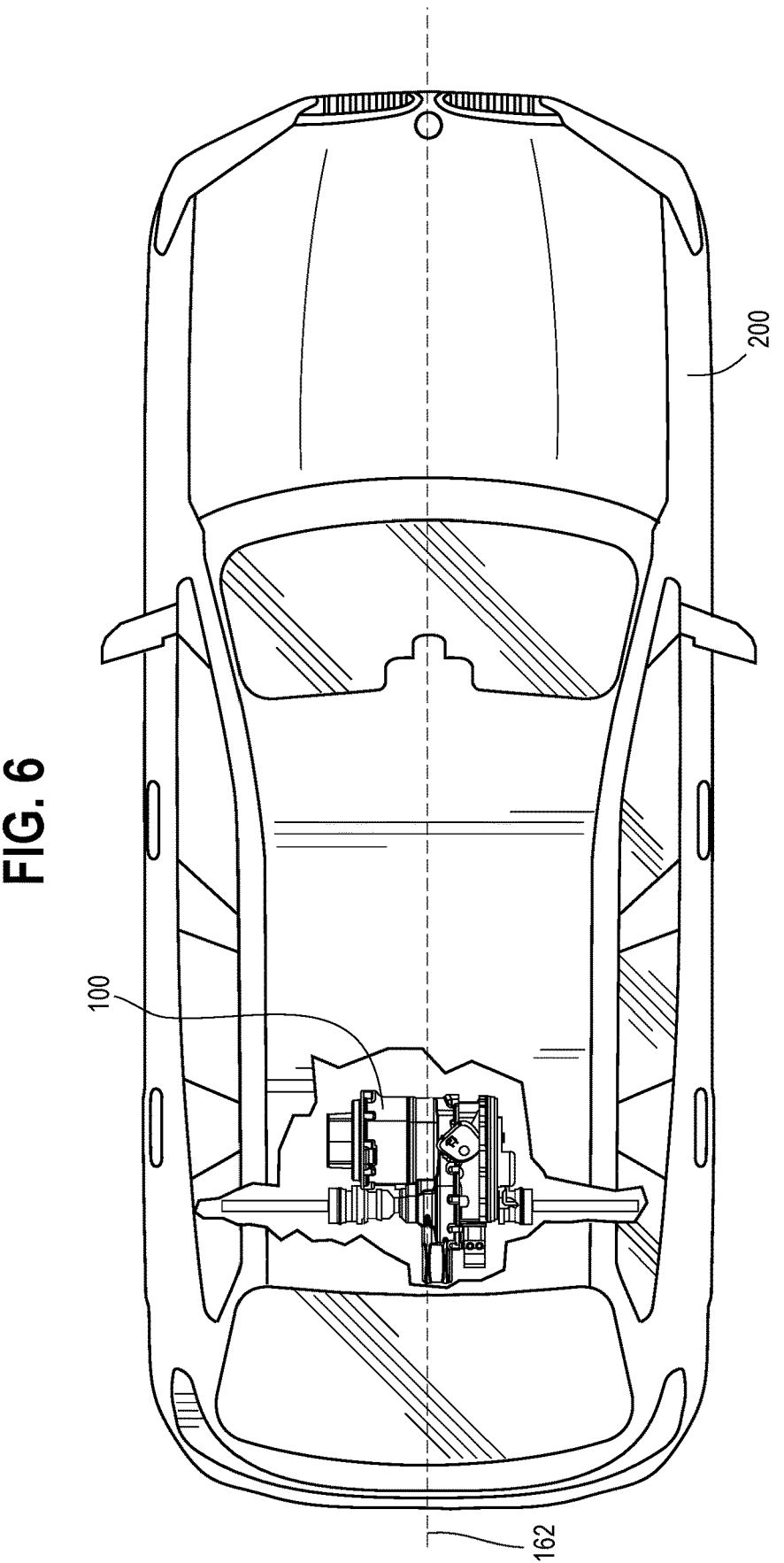
FIG. 6 illustrates the electrical drive unit mounted within an electric vehicle in accordance with various embodiments.

FIG. 6 shows a top-down view the electrical drive unit 100 mounted within an EV 200 in accordance with various embodiments. The electrical drive unit 100 may be mounted in the rear of the EV 200, as is shown in FIG. 6, and attached to the rear wheels. Alternatively, the electrical drive unit 100 may be mounted in the front of the EV 200 and attached to the front wheels. Alternatively still, the EV 200 may include two electrical drive units 100, one mounted in the front and another mounted in the back of the EV 200. FIG. 6 also shows a centerline 162 of the EV 200 in the transverse direction (e.g., a center of the transverse width of the EV 200). As can be seen in FIG. 6, and is shown in further detail in FIG. 7, in accordance with various embodiments, the centerline 162 of the EV 200 passes through the motor 102 and the transverse projection portion 122, while the main gearbox portion 120 is located offset from the centerline 162 of the EV 200.

Figure 7:
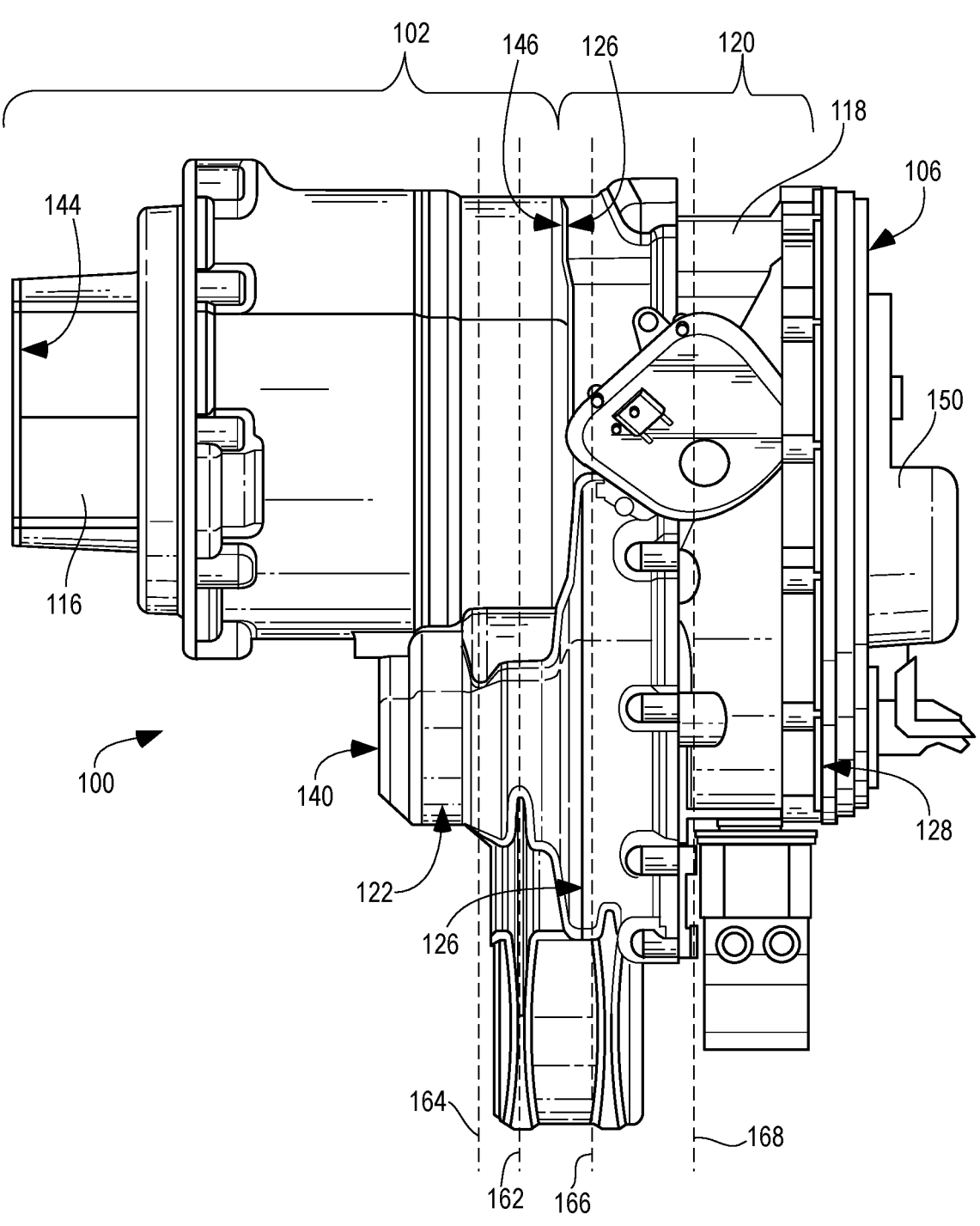
FIG. 7 illustrates the top-down view of the electrical drive unit of FIG. 1 including further details in accordance with various embodiments.

FIG. 7 shows the top-down view the electrical drive unit 100 of FIG. 1 including further details in accordance with various embodiments. As discussed above, the centerline 162 of the EV 200 is illustrated. Also illustrated is the centerline 164 of the electrical drive unit 100, which is the center of the width in the transverse direction of the electrical drive unit 100, from the motor end cover 116 to the power inverter cover 150. As is shown in FIG. 7, the centerline 162 of the EV 200 may be close to but not exactly aligned with the centerline 164 of the electrical drive unit 100. However, in other embodiments, the two centerlines 162 and 164 may be aligned. FIG. 7 also shows the centerline 166 of the gearbox 104. This centerline 166 is the center of the width in the transverse direction of the gearbox 104, from the first transverse side 140 of the transverse projection portion 122 (e.g., the left-most extent of the gearbox 104) to the second transverse side 128 of the main gearbox portion 120 (e.g., the right-most extent of the gearbox 104). Similarly, FIG. 7 shows the centerline 168 of the main gearbox portion 120. This centerline 168 is the center of the width in the transverse direction of the main gearbox portion 120, from the first transverse side 126 of the main gearbox portion 120 to the second transverse side 128 of the main gearbox portion 120.

As is shown in FIG. 7, the centerline 166 of the gearbox 104 is offset from the centerline 164 of the electrical drive unit 100. Similarly, the centerline 166 of the gearbox 104 is also offset from the centerline 164 of the EV 200. Also, the centerline 168 of the main gearbox portion 120 is offset from the centerline 164 of the electrical drive unit 100. Similarly still, the centerline 168 of the main gearbox portion 120 is offset from the centerline 162 of the EV 200. Specifically, the centerline 166 of the gearbox 104 and the centerline 168 of the main gearbox portion 120 are both shifted in the second transverse direction (e.g., to the right) relative to the centerline 164 of the electrical drive unit 100 and the centerline 162 of the EV 200.

In various embodiments, as is shown in FIGS. 2 and 7, the second transverse end 146 of the motor 102 extends over the centerline 162 of the EV 200 in the second transverse direction (e.g., to the right), and also may extend over the centerline 164 of the electrical drive unit 100 in the second transverse direction (e.g., to the right). Similarly, the first transverse end 144 of the motor 102 may be located on a first side (e.g., the left side in the figures) of the centerline 164 of the electrical drive unit 100 and/or of the centerline 162 of the EV 200 in the first transverse direction. In various embodiments, the second transverse end 146 of the motor 102 may be located on a second side (e.g., the right side in the figures) of the centerline 164 of the electrical drive unit 100 and/or of the centerline 162 of the EV 200 in the second transverse direction.

As is also shown in FIGS. 2 and 7, in various embodiments, the differential section 132 may be on or near the centerline 162 of the EV 200. In some embodiments, the first transverse end 152 of the differential section 132 may be on a first side (e.g., left side) of a centerline 162 of the EV 200 or a centerline 164 of the electrical drive unit 100 in the first transverse direction, and the second transverse end 154 of the differential section 132 may be on a second side (e.g., right side) of the centerline 162 of the EV 200 or the centerline 164 of the electrical drive unit 100 in the second transverse direction. That is, the centerline 162 of the EV 200 and/or the centerline 164 of the electrical drive unit 100 may run through a portion of the differential section 132, while in a specific embodiment, it may run through the center of the differential section 132. In this way, the first drive shaft assembly 134 and the second drive shaft assembly 136 may have similar lengths to each of the wheels, which helps balances the EV 200 and improves the handling and feel of the EV 200. Additionally, although the motor 102 may extend over the centerline 162 of the EV 200 and/or the centerline 164 of the electrical drive unit 100, the differential section 132 can still be maintained in a relatively centralized location near the centerline 162 of the EV 200 due to the "L-shaped" configuration of the gearbox 104.

So configured, the disclosed layout for the electrical drive unit 100 allows the motor 102 to cross the centerline 162 of the EV 200 and/or the centerline 164 of the unit 100, to maximize the space utilized for the motor 102 to allow for a longer and more powerful motor to be utilized and/or other motor types such as SSM motors. The overall width required by the unit 100 is reduced, which can reduce the overall weight of the electrical drive unit 100. Further still, because the motor 102 crosses the centerline 162 of the EV 200 and/or the centerline 164 of the electrical drive unit 100, the unit 100 has a center of gravity much closer to the centerline 162 of the EV 200 and/or the centerline 164 of the unit 100, improving weight balance and handling of the EV 200. Additionally, this centralized center of gravity evenly distributes the weight and forces at the multiple vehicle mounts 160 between the unit 100 and the EV 200, which improves long-term wear on those components, as well as helps reduce vibration and noise generation within the EV 200 by the electrical drive unit 100.

Additionally, by utilizing a central housing 112, the unit 100 is stronger and stiffer than when utilizing separate, modular housing components, particularly at the junction between the motor 102 and the gearbox 104 where torque forces are high. Further, the single integrated central housing 112 reduces the number of individual parts in the electrical drive unit 100, and specifically reduces or eliminates the number of bolts and connections between the motor 102 and gearbox 104, which reduces the likelihood for failure at the interface between the motor 102 and the gearbox 104. Additionally, the improved stiffness of the electrical drive unit 100 with the use of the central housing 112 causes the unit 100 to be quieter, to produce less vibration, and to be more responsive. Additionally, cooling is improved with the central housing 112 as coolant routing is more efficient within the one central housing 112 rather than two or more separate housings with connections between. Additionally, the likelihood of leaks at an interface between the motor 102 and the gearbox 104 is greatly reduced and the design is simplified with fewer or no connections and the omission of various gaskets and/or tubing between the motor 102 and the gearbox 104.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical drive unit assembly for a vehicle comprising:

an electrical drive unit comprising:

an electric motor having a first transverse end extending in a first transverse direction and an opposite second transverse end extending in a second transverse direction, wherein the first transverse direction is opposite from the second transverse direction;

a motor shaft extending in the second transverse direction out of the motor;

a gearbox including a main gearbox portion and a transverse projection portion; and a housing comprising:

a motor housing portion including a first transverse end extending in the first transverse direction, and a second transverse end extending in the second transverse direction; and a main gearbox housing portion including a first transverse end extending in the first transverse direction, and a second transverse end extending in the second transverse direction, wherein the motor housing portion and the main gearbox housing portion meet at the second transverse end of the motor housing portion and the first transverse end of the main gearbox housing portion, wherein the housing comprises a central housing comprising a single cast and/or machined housing part that forms at least a portion of the main gearbox housing portion and at least a portion of the motor housing portion, wherein the central housing includes a first transverse end extending in the first transverse direction, and a second transverse end extending in the second transverse direction, wherein the motor includes a stator having a first transverse end in the first transverse direction and a second transverse end in the second transverse direction, and wherein the first transverse end of the central housing extends in the first transverse direction beyond the first transverse end of the stator, such that the first transverse end of the stator exists entirely within the portion of the central housing forming the at least the portion of the motor housing portion, wherein the motor shaft extends out of and past the second transverse end of the motor housing portion, past the first transverse end of the main gearbox housing portion, and into the main gearbox housing portion, wherein the motor is attached to the gearbox via an input gear of the gearbox attached to the motor shaft, wherein the motor is located on a first transverse side of the main gearbox portion in the first transverse direction at least via the motor shaft, wherein the transverse projection portion includes at least one gear of the gearbox and extends from the first transverse side of the main gearbox portion in the first transverse direction, wherein the transverse projection portion and at least a portion of the at least one gear extends in the first transverse direction beyond the second transverse end of the motor housing portion, wherein the first transverse end of the motor housing portion is located on a first side of a centerline of the electrical drive unit in the first transverse direction, and where the second transverse end of the motor housing portion is located on a second side of the centerline of the electrical drive unit in the second transverse direction, and wherein the input gear is located entirely on the second side of the centerline of the electrical drive unit in the second transverse direction.

2. The electrical drive unit assembly of claim 1, wherein the main gearbox portion and the transverse projection portion together form an L-shape.

3. The electrical drive unit assembly of claim 1, wherein the gearbox includes a differential section, and wherein the at least one gear in the transverse projection portion forms at least a part of the differential section.

4. The electrical drive unit assembly of claim 1, wherein the transverse projection portion includes a first opening on a first transverse side of the transverse projection portion in the first transverse direction, the first opening configured to receive a first drive shaft assembly, and wherein a second transverse side of the main gearbox portion in the second transverse direction includes a second opening configured to receive a second drive shaft assembly.

5. The electrical drive unit assembly of claim 4, wherein the first transverse end of the stator exists on a first side in the first transverse direction relative to the first transverse side of the transverse projection portion, and wherein the second transverse end of the stator exists on an opposite second side in the second transverse direction relative to the first transverse side of the transverse projection portion.

6. The electrical drive unit assembly of claim 1, wherein a centerline of the gearbox is offset from the centerline of the electrical drive unit.

7. The electrical drive unit assembly of claim 1, wherein a centerline of the main gearbox portion is offset from the centerline of the electrical drive unit.

8. The electrical drive unit assembly of claim 1, further comprising a power inverter located on a second transverse side of the main gearbox portion in the second transverse direction.

9. The electrical drive unit assembly of claim 1, further comprising a gearbox cover configured to attach to a side of the central housing in the second transverse direction and enclose a plurality of gears of the gearbox within the main gearbox housing portion.

10. The electrical drive unit assembly of claim 9, wherein the main gearbox housing portion is formed at least in part by the gearbox cover.

11. The electrical drive unit assembly of claim 9, further comprising a power inverter attached to a second transverse side of the gearbox cover in the second transverse direction.

12. The electrical drive unit assembly of claim 1, wherein the central housing further includes a housing portion that forms the transverse projection portion.

13. The electrical drive unit assembly of claim 1, wherein the motor, the at least one gear of the gearbox, and a plurality of other gears of the gearbox are mounted within the central housing.

14. The electrical drive unit assembly of claim 1, wherein the electrical drive unit further comprises a parking brake located at least partially within the main gearbox housing portion, wherein the parking brake is configured to interface directly or indirectly with the motor shaft in order to implement a parking brake function.

15. An electric vehicle comprising an electrical drive unit, the electrical drive unit comprising:

an electric motor having a first transverse end extending in a first transverse direction and an opposite second transverse end extending in a second transverse direction, wherein the first transverse direction is opposite from the second transverse direction;

a motor shaft extending in the second transverse direction out of the motor;

a gearbox including a main gearbox portion and a transverse projection portion; and a housing comprising:

a motor housing portion including a first transverse end extending in the first transverse direction, and a second transverse end extending in the second transverse direction; and a main gearbox housing portion including a first transverse end extending in the first transverse direction, and a second transverse end extending in the second transverse direction, wherein the motor housing portion and the main gearbox housing portion meet at the second transverse end of the motor housing portion and the first transverse end of the main gearbox housing portion, wherein the motor shaft extends out of and past the second transverse end of the motor housing portion, past the first transverse end of the main gearbox housing portion, and into the main gearbox housing portion, wherein the second transverse end of the motor is attached to the gearbox on a first transverse side of the main gearbox portion in the first transverse direction, wherein the transverse projection portion includes at least one gear of the gearbox and extends from the first transverse side of the main gearbox portion in the first transverse direction, wherein the transverse projection portion and at least a portion of the at least one gear extends in the first transverse direction beyond the second transverse end of the motor housing portion, wherein the first transverse end of the motor housing portion is located on a first side of a centerline of the electrical drive unit in the first transverse direction, and where the second transverse end of the motor housing portion is located on a second side of the centerline of the electrical drive unit in the second transverse direction, wherein an interface between an input gear of the gearbox that is attached to the motor shaft and at least one other gear of the gearbox is located entirely on the second side of the centerline of the electrical drive unit in the second transverse direction, wherein the transverse projection portion includes two drive shaft openings, and wherein the electrical drive unit includes a battery voltage connector located such that the two drive shaft openings are situated between the battery voltage connector and the motor shaft.

16. The electric vehicle of claim 15, wherein the main gearbox portion and the transverse projection portion together form an L-shape.

17. The electric vehicle of claim 15, further comprising a first drive shaft assembly and a second drive shaft assembly configured to enter the two drive shaft openings.

18. The electric vehicle of claim 15, wherein a centerline of the main gearbox portion is offset from a centerline of the electric vehicle.

19. The electric vehicle of claim 15, wherein the second transverse end of the motor extends over a centerline of the electric vehicle in the second transverse direction.

20. The electric vehicle of claim 15, wherein the gearbox includes a differential section, and wherein the at least one gear in the transverse projection portion forms at least a part of the differential section, wherein the differential section includes a first transverse end in the first transverse direction and a second transverse end in the second transverse direction, wherein the first transverse end of the differential section is on a first side of a centerline of the electric vehicle in the first transverse direction, wherein the second transverse end of the differential section is on a second side of the centerline of the electric vehicle in the second transverse direction, and wherein a centerline of the gearbox is offset from the centerline of the electric vehicle.

* * * * *